US009333938B2

(12) United States Patent
Guerrero et al.

(10) Patent No.: US 9,333,938 B2
(45) Date of Patent: May 10, 2016

(54) DUAL CHAMBERED PASSENGER AIRBAG

(71) Applicants: TK Holdings Inc., Auburn Hills, MI (US); Honda Motor Co., Ltd., Tokyo (JP)

(72) Inventors: Michael D. Guerrero, Rochester, MI (US); Jaime F. Perez, Lake Orion, MI (US); Vivek Maripudi, Bloomfield Hills, MI (US); Ryan Miller, Columbus, OH (US); Jason Hardesty, Columbus, OH (US); Andrew Solomon, Plain City, OH (US)

(73) Assignees: TK Holdings Inc., Auburn Hills, MI (US); Honda Motor Co., LTD. (JP)

( * ) Notice: Subject to any disclaimer, the term of this patent is extended or adjusted under 35 U.S.C. 154(b) by 0 days.

(21) Appl. No.: 14/452,016

(22) Filed: Aug. 5, 2014

(65) Prior Publication Data

US 2015/0035263 A1 Feb. 5, 2015

Related U.S. Application Data

(60) Provisional application No. 61/862,491, filed on Aug. 5, 2013.

(51) Int. Cl.
*B60R 21/233* (2006.01)
(52) U.S. Cl.
CPC ..... *B60R 21/233* (2013.01); *B60R 2021/23324* (2013.01)
(58) Field of Classification Search
CPC ............... B60R 21/233; B60R 21/239; B60R 2021/23324
USPC ....................................................... 280/739
See application file for complete search history.

(56) References Cited

U.S. PATENT DOCUMENTS

| 5,586,782 | A | * | 12/1996 | Zimmerman et al. ..... 280/730.2 |
|---|---|---|---|---|
| 5,697,641 | A | | 12/1997 | McGee et al. |
| 5,839,755 | A | * | 11/1998 | Turnbull ........................ 280/739 |
| 6,059,312 | A | * | 5/2000 | Staub et al. .................... 280/729 |
| 7,712,779 | B2 | * | 5/2010 | Kim ................................. 280/739 |
| 2004/0232675 | A1 | | 11/2004 | Marotzke |
| 2007/0170710 | A1 | * | 7/2007 | Bouquier ....................... 280/739 |
| 2011/0241322 | A1 | * | 10/2011 | Nozaki ............. B60R 21/23138 280/730.2 |
| 2012/0025497 | A1 | * | 2/2012 | Yoo ............................... 280/729 |
| 2012/0248746 | A1 | | 10/2012 | Yamamoto |
| 2014/0151985 | A1 | * | 6/2014 | Hotta et al. ................. 280/730.2 |
| 2014/0306433 | A1 | * | 10/2014 | Anderson et al. ............. 280/729 |

* cited by examiner

*Primary Examiner* — Ruth Ilan
(74) *Attorney, Agent, or Firm* — L.C. Begin & Associates, PLLC (57) ABSTRACT

An airbag includes an outer shell defining an interior of the airbag, and a divider positioned in the interior so as to divide the interior into a first chamber and a second chamber. A valve mechanism is operatively coupled to the divider. The valve mechanism includes an opening enabling fluid communication between the first and second chambers, and a flap positioned in the second chamber overlying the opening. The flap is structured to deflect in a direction away from the opening responsive to a pressure differential urging a flow of gas from the first chamber through the opening into the second chamber. The flap is also structured to block the opening responsive to a reverse pressure differential urging a flow of gas from the second chamber through the opening into the first chamber. The flap includes at least one attachment edge along which the flap is attached to the divider and at least one non-attachment edge along which the flap is not attached to the divider. The valve is structured such that at least a predetermined minimum distance between the at least one non-attachment edge and an edge of the opening is maintained during application of the reverse pressure differential to the flap.

8 Claims, 5 Drawing Sheets

DUAL CHAMBERED PASSENGER AIRBAG

CROSS-REFERENCE TO RELATED APPLICATIONS

This application claims the benefit of U.S. Provisional Application Ser. No. 61/862,491, filed on Aug. 5, 2013, the disclosure of which is hereby incorporated by reference in its entirety.

BACKGROUND OF THE INVENTION

The embodiments described herein relate to a passenger airbag, which is filled with gas during an emergency situation such as, for example, a frontal or side impact. More particularly, the embodiments described herein relate to a passenger airbag incorporating a divider which separates an interior of the airbag into a plurality of chambers, and an inter-chamber venting system for controlling gas flow between the chambers.

Upon activation of a vehicle airbag system, an inflation gas typically enters a first chamber of a vehicle passenger airbag, then proceeds into one or more additional chambers which are in fluid communication with the first chamber. In certain scenarios, it is desirable to restrict backflow of gases from a second chamber into the first chamber from which the second chamber was filled. This aids in maintaining pressure in the second chamber during passenger contact with the portion of the airbag exterior of the second chamber, thereby helping to cushion the passenger for a relatively longer period of time. The gas flow control mechanism should enable rapid filling of the second chamber (and any other chambers) from the first chamber. In addition, in order to maintain pressure in the second chamber, the gas flow control mechanism should also rapidly respond to a gas backflow condition or reverse pressure differential tending to force gases back into the first chamber, by acting to restrict the backflow to the desired degree.

In view of these requirements, an ongoing need exists for improved methods and mechanisms for controlling gas flow between the chambers of an airbag.

SUMMARY OF THE INVENTION

In one aspect of the embodiments of the described herein, an airbag is provided. The airbag includes an outer shell defining an interior of the airbag, and a divider positioned in the interior so as to divide the interior into a first chamber and a second chamber. A valve mechanism is operatively coupled to the divider. The valve mechanism includes an opening enabling fluid communication between the first and second chambers, and a flap positioned in the second chamber overlying the opening. The flap is structured to deflect in a direction away from the opening responsive to a pressure differential urging a flow of gas from the first chamber through the opening into the second chamber. The flap is also structured to block the opening responsive to a reverse pressure differential urging a flow of gas from the second chamber through the opening into the first chamber. The flap includes at least one attachment edge along which the flap is attached to the divider and at least one non-attachment edge along which the flap is not attached to the divider. The valve is structured such that at least a predetermined minimum distance between the at least one non-attachment edge and an edge of the opening is maintained during application of the reverse pressure differential to the flap.

In another aspect of the embodiments described herein, a divider for an airbag is provided. The divider includes a first side, a second side opposite the first side, and an opening enabling fluid communication between the first and second sides. A flap is secured to the second side and positioned to overlie the opening. The flap is structured with respect to the opening so as to prevent any edge of the flap from entering the opening.

In another aspect of the embodiments of the described herein, an airbag is provided. The airbag includes an outer shell defining an interior of the airbag, and a divider positioned in the interior so as to divide the interior into a first chamber and a second chamber. A valve mechanism is operatively coupled to the divider. The valve mechanism includes an opening enabling fluid communication between the first and second chambers, and a flap positioned in the second chamber overlying the opening. The flap is structured to deflect in a direction away from the opening responsive to a pressure differential urging a flow of gas from the first chamber through the opening into the second chamber. The flap is also structured to block the opening responsive to a reverse pressure differential urging a flow of gas from the second chamber through the opening into the first chamber. The flap includes at least one attachment edge along which the flap is attached to the divider and at least one non-attachment edge along which the flap is not attached to the divider. The valve is structured so that the at least one non-attachment edge overlaps an edge of the opening during application of the reverse pressure differential to the flap, thereby forming a gas flow passage defined by a portion of the edge of the opening and a portion of the at least one non-attachment edge.

DETAILED DESCRIPTION

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

Embodiments of the present invention will be described below with reference to the drawings. One of ordinary skill in the art will appreciate the various aspects of airbag design, construction and operation applicable to the embodiments of the present invention described herein. U.S. Pat. Nos. 6,886,857, 7,857,347, 8,128,124, and 8,322,748, for example, describe many such aspects and are incorporated herein by reference in their entirety, but not by way of limitation.

Figures 1, 2, 2A:
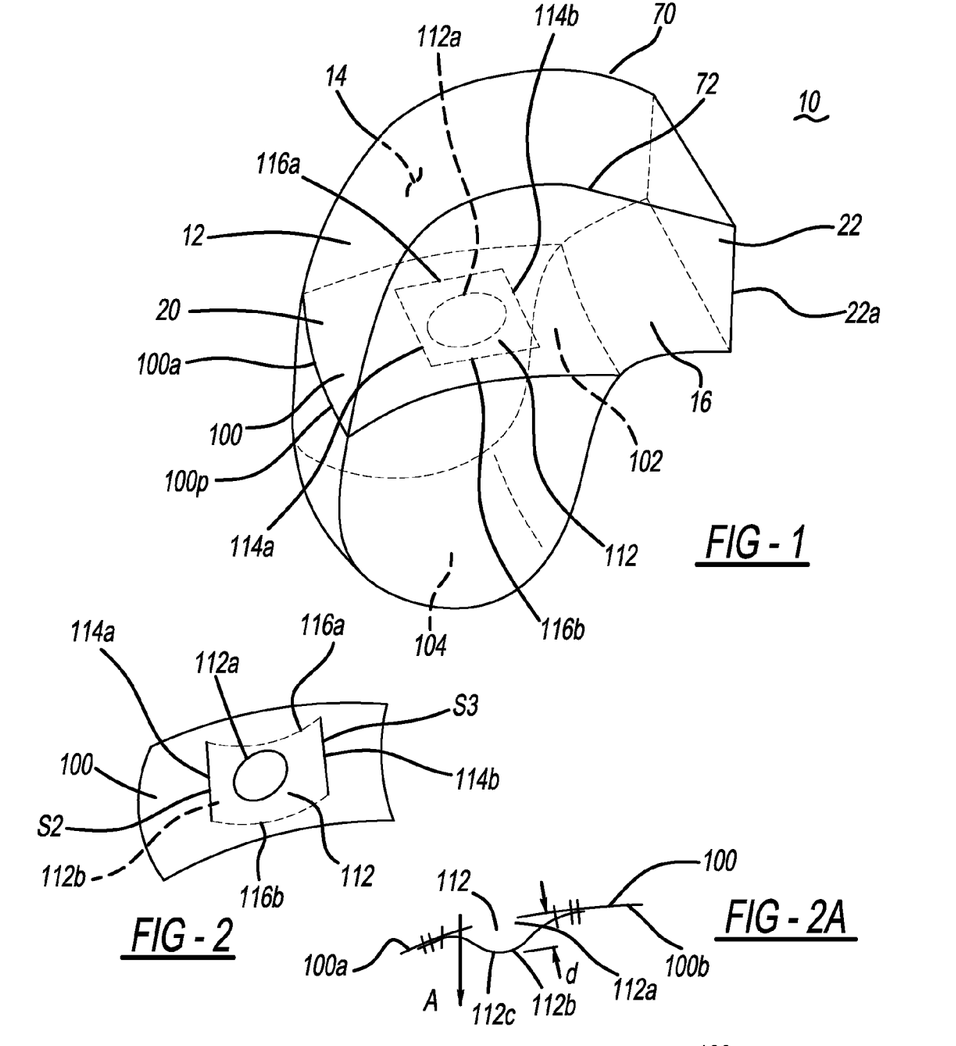
FIG. 1 is a schematic perspective view of a passenger-side airbag (in an inflated state) incorporating an airbag divider and a flow control valve in accordance with an embodiment described herein.
FIG. 2 is a perspective view of an airbag internal divider incorporating a valve in accordance with an embodiment described herein.
FIG. 2A is a cross-sectional side view of a portion of the divider and valve embodiment of FIG. 2, showing the valve in an open condition.

FIG. 1 is a view of one embodiment of a passenger-side airbag 10 (in an inflated state). The airbag embodiment shown in FIG. 1 has an outer shell formed from three panels which combine to define an interior of the airbag. Specifically, the airbag is formed from a main panel 12, a right side (when viewing the airbag from the perspective of a seated passenger) panel 16, and a left side panel 14 opposite the right side panel 16. Each of the side panels 14, 16 is generally planar (when the airbag 10 is inflated). The main panel 12 connects the left and right panels and wraps around the airbag 10. As a result, the entirety of the left edge of the main panel 12 is connected along a seam 70 (e.g., by stitching, sewing, adhesive attachment or other suitable means) to the left panel 14 and the entirety of the right edge of the main panel 12 is connected along a seam 72 (e.g., by stitching, sewing, or other suitable means) to the right panel 16.

The main panel 12 has both a front impact side 20 and a rear inflation side 22. Side panels 14 and 16 and main panel 12 also combine to define a mouth 22a of the airbag through which gas is injected into the airbag. After wrapping around the airbag 10, ends of the main panel 12 are joined at the rear inflation side. In addition, the rear inflation side 22 has slits (not shown) which are sized to receive an inflator (not shown), and may also include holes (not shown) which are sized to receive bolts (or other suitable fasteners) that are configured to secure the airbag 10 to the body of an automobile (or other device). Portions of one or more of panels 12, 14, 16 defining an upper chamber 102 (described in greater detail below) may also incorporate one or more vents (not shown) therein to release gas from the upper chamber in a controlled manner during contact between a passenger and the airbag.

Figure 2B:
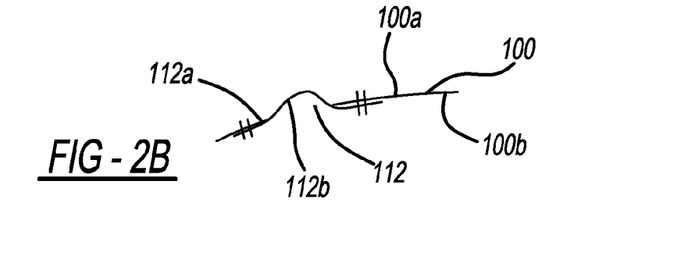
FIG. 2B is a cross-sectional side view of a portion of the divider and valve embodiment of FIG. 2, showing the valve in a closed condition.

Referring to FIGS. 1-2b, a divider 100 is stitched or otherwise suitably attached along a perimeter thereof to interior surfaces of the main, left and right airbag panels. The divider 100 includes a panel 100p having a first side 100a and a second side 100b opposite the first side. The divider 100 is attached to the panel interior surfaces so as to form a gas-tight seal between the divider and the panels forming the outer shell to which the divider it is attached. Divider 100 divides the airbag interior into a first or upper chamber 102 and a second or lower chamber 104. Panels 12, 14 and 16 and divider 100 may be formed in a known manner from gas-impermeable fabric(s) or other suitable gas-impermeable material(s).

In the embodiments described herein, the airbag is structured to fill by receiving inflation gas into the upper chamber 102. A portion of this gas is then transferred to the lower chamber 104. Thus, the upper chamber 102 becomes a relatively higher pressure region of the airbag, while the lower chamber 104 is a relatively lower pressure region. In alternative embodiments, the airbag may be structured to fill by receiving inflation gas into the lower chamber 104. A portion of this gas is then transferred to the upper chamber 102 to complete inflation of the airbag. Thus, in these embodiments, the lower chamber 104 becomes the relatively higher pressure region of the airbag, while the upper chamber 102 is the relatively lower pressure region.

An inter-chamber venting system is provided to permit gas to flow from the relatively higher pressure chamber (in this embodiment, upper chamber 102) into the relatively lower pressure chamber (in this embodiment, lower chamber 104), and also to restrict backflow from the lower chamber 104 into the upper chamber 102. In one embodiment, the inter-chamber venting system is in the form of a valve mechanism 112 (shown schematically in FIGS. 1 and 2) incorporated into or operatively coupled to the divider 100 for controlling gas flow between the upper and lower chambers. Valve 112 may have any of a number of structures suitable for controlling gas flow in the airbag interior, in the manner described herein.

The gas flow rate from the upper chamber 102 through the valve into the lower chamber 104 may be controlled in a known manner by controlling the valve structure and dimensions. In the embodiments described herein, the valve is a gas flow restriction valve structured to restrict a return flow of gases from the lower chamber back into the upper chamber. To this end, in particular embodiments, the valve is structured to close responsive to the occurrence of a pressure differential between the lower and upper chambers tending to force gas in a direction opposite the airbag fill direction (i.e., in a direction form the second chamber back into the upper chamber). Closure of the valve in response to this pressure differential helps maintain a prolonged sustained pressure in the lower chamber.

Referring to FIGS. 1 and 2, in one embodiment, valve 112 includes a circular opening 112a formed in divider 100 to enable fluid communication therethrough, between upper chamber 102 and lower chamber 104. A valve flap 112b formed from a suitable gas-impermeable material is secured to divider 100 so as to overlie and cover the edges of opening 112a. In the embodiment shown, flap 112b is rectangular. However, the flap may have any alternative shape suitable for a particular application, depending on, for example, the size of the valve opening 112a, the number of openings, the shape(s) of the opening(s), and other pertinent parameters.

Referring to FIGS. 2, 2A, 4 and 4A, in the embodiment shown, flap 112b has a pair of opposed attachment portions 114a and 114b a pair of opposed non-attachment portions 116a and 116b. In the embodiment shown, attachment portions 114a and 114b are regions extending along and adjacent to opposite edges of the flap. Flap 112b is structured and attached to divider 100 such that a pressure differential tending to force inflation gas from upper chamber 102 into lower chamber 104 will tend to force the flap 112b in a direction away from opening 112a, thereby maintaining an open condition of the valve, and permitting gases to flow through opening 112a and into lower chamber 104 between the divider 100 and non-attachment flap edges 116a and 116b. The flap is also attached to the divider so that a plane bisecting the attachment edges 114a and 114b also passes through a center of the opening 112a.

In the embodiment shown, the flap 112b is positioned along a side or face 100b of the divider residing in lower chamber 104, and attachment edges 114a and 114b are attached to this side 100a of the divider along associated attachment seams spaced apart from edges of opening 112a by stitching, sewing, or other suitable means designed to maintain the attachment during operation of the valve 112 as described herein. FIG. 2A shows a cross-sectional view of a portion of divider 100 with valve 112 in an open condition, with gases flowing along arrows "A" through the flap and into lower chamber 104.

Also, flap 112b is structured and attached to divider 100 so as to close opening 112a to restrict a flow of gases from the lower chamber 104 back to the upper chamber 102 responsive to a pressure differential wherein the lower chamber pressure is greater than the upper chamber pressure. Specifically, the flap is structured and attached to the divider 100 so that a pressure differential tending to force gases from the lower chamber 104 into the upper chamber 102 will urge the central portion 112c of the flap toward and into the opening 112a, thereby closing or blocking the opening and restricting backflow of gases into upper chamber 102. FIG. 2B shows a cross-sectional view of a portion of divider 100 with valve 112 in a closed condition responsive to a relatively higher pressure in lower chamber than in upper chamber 102.

Figure 2C:
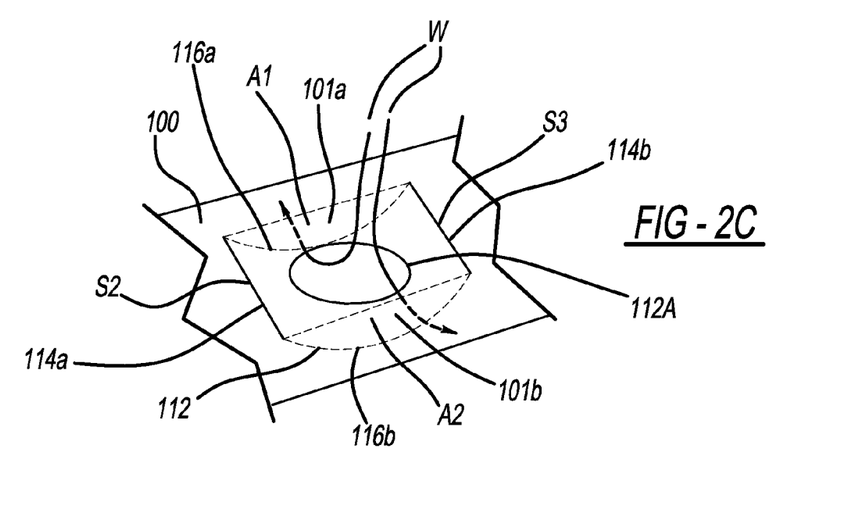
FIG. 2C is a perspective view of the divider and valve embodiment of FIG. 2, showing the valve in an open condition

In the embodiment shown, inflation gases enter the airbag into upper chamber 102, flow through opening 112a and impinge upon flap 112b as indicated by arrows W, forcing the flap away from divider 100. The gases then flow along the surfaces of the divider and through opposed gas flow passages 101a and 101b defined by the divider 100 and the non-attachment edges 116a and 116b. The boundaries of these gas flow passages are indicated in FIG. 2C by dashed lines. Passage 101a has an area A1 and passage 101b has an area A2.

It is desirable for the valve mechanism to impede gas flow from the upper chamber 102 into the lower chamber 104 as little as possible, so that the entire volume of the airbag fills as rapidly as possible. To this end, both the area of divider opening 112a and the combined area A1+A2 of the opposed gas flow passages 101a and 101b are specified so as to ensure gas flow into the lower chamber 104 at a rate sufficient to fill the airbag within a predetermined time period.

Figure 4:
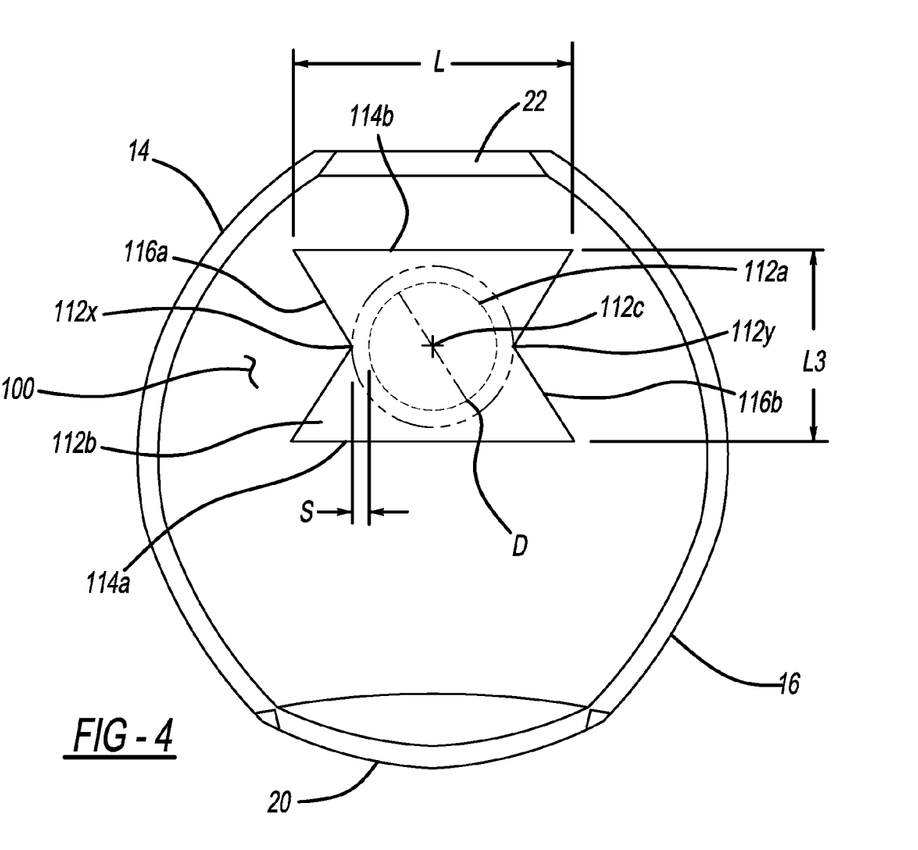
FIG. 4 is a schematic plan view of an embodiment of a divider and an attached non-return valve showing design parameters for a specific embodiment of the valve flap and attachment, and showing a simulated movement of the non-attachment portions of the flap toward the valve opening during filling and/or operation of the airbag.
Figure 4A:
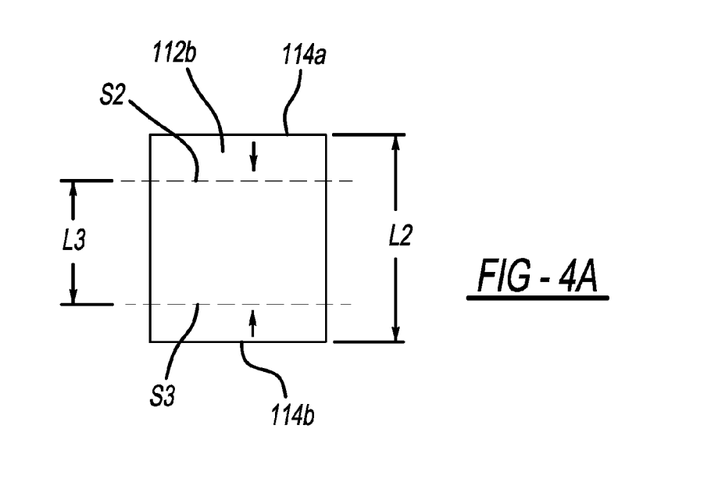
FIG. 4A is a schematic view of a valve flap in accordance with an embodiment described herein, showing the difference between a spacing L2 between attachment portions or seams of the flap when the flap is extended or spread flat, and a spacing L3 between attachment seams along a divider to which the flap attachment portions are to be attached.

Referring to FIG. 2A, the flap extends a maximum distance d from the divider during flow of gases from the upper chamber into the lower chamber. FIG. 4A shows an embodiment of the flap 112b spread flat and prior to attachment to the divider. Referring to FIGS. 2A, 4 and 4A, the distance d is a function of the difference between the distance L2 between lines along the flap where the attachment seams will be applied to attach the flap to the divider (as measured when the flap is spread flat and is unattached to the divider), and the distance L3 between locations of parallel seam lines S2 and S3 on the divider along which the flap will be attached, where L2>L3. Thus, attachment edges 114a and 114b are brought toward each other to attach the edges to the divider along respective ones of seam lines S2 and S3. As the difference between L2 and L3 increases, there is more excess flap material between the attachment seams. Therefore, the distance d will increase. In general, this permits the gas passage areas A1 and A2 to increase, thereby enabling an increase in gas flow to the lower chamber.

Figure 4B:
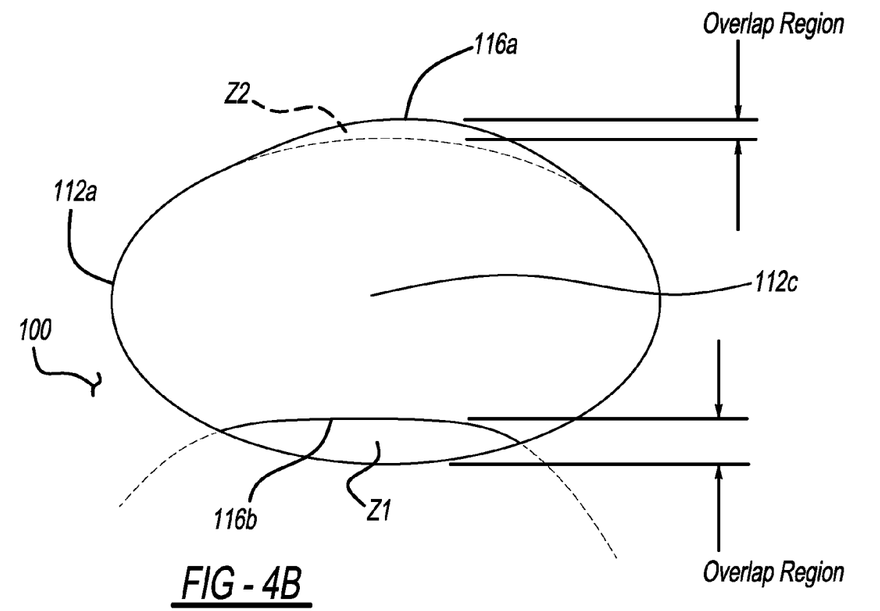
FIG. 4B is a schematic perspective view showing edges of a flap overlapping edges of a divider opening, in accordance with one embodiment described herein.

During operation of the valve, it has been found that, as the central portion 112c of the flap 112b is forced into the opening 112a, the non-attachment edges 116a and 116b of the flap will also be drawn toward the opening. It has also been found that if the flap central portion 112c is forced far enough through the opening 112a, a portion of one or more of the non-attachment edges 116a and 116b may be drawn past the edge of the opening 112a and/or into the opening, thereby overlapping with a portion of the opening 112a as shown in FIG. 4B and permitting gases to flow between the edge of the opening 112a and the non-attachment edge(s) 116a and or 116b. It has also been found that, in general, as the lengths L of the attachment edges are reduced (for a given value of dimension d), the non-attachment edges 116a and 116b are permitted to more closely approach the edges of the divider opening 112a responsive to a reverse pressure differential urging gases from the lower chamber to the upper chamber. In general, a reverse pressure differential is defined as a pressure differential urging gases in a direction from a second chamber back into a first chamber from which the gases were received into the second chamber. In addition, it has been found that as the distance d increases, the non-attachment edges 116a and 116b are permitted to more closely approach the edges of the divider opening 112a responsive to a reverse pressure differential.

It has been advantageously found that the diameter of the opening 112a, the lengths L of the attachment edges, and the dimensions L2 and L3 (affecting the distance d) may be specified in relation to each other so as to prevent overlap between the non-attachment edges 116a and 116b and the edges of the opening 112a. More specifically, it has been found that values of these parameters may be determined such that (a) the various openings (112a and flow passage areas A1 and A2) are sized to ensure gas flow into the lower chamber 104 at a rate sufficient to fill the airbag within a desired predetermined time period; and (b) the non-attachment edges 116a and 116b are maintained at least a predetermined distance S from the edges of opening 112a when a reverse pressure differential is applied to the flap. FIG. 4 shows the minimum predetermined distance S when the divider is spread flat, and the flap 112b is attached to the divider and pressed flat against the divider. FIG. 4 shows the locations 112x and 112y at which portions of the flap will most closely approach edges of the opening 112a, when forced inwardly toward the opening 112a by a relatively higher pressure pushing the central portion of the flap into opening 112a. Values of the parameters L, L2, L3, A1, A2, d, and the diameter D of opening 112a needed to maintain a desired minimum predetermined distance S for a particular application may be determined analytically or iteratively, through experimentation, for example.

FIG. 4 shows an embodiment of the divider and a flap attached thereto, viewed from the perspective of the lower chamber 104 and looking toward the divider. Referring to FIG. 4, in this embodiment, the values of the parameters set forth above are specified such that at least a minimum distance S is maintained between any portion of either of non-attachment edges 116a and 116b and the edge of opening 112a when the divider 100 is extended and maintained in an extended configuration by gas pressures within the airbag, and the central portion of the flap 112b is pushed into the opening 112a during operation of the valve.

Figure 5A:
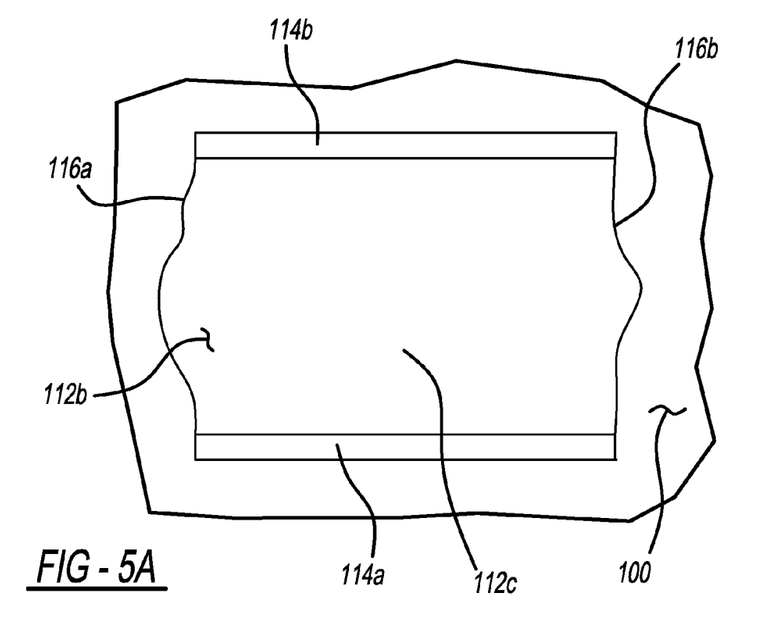
FIG. 5A is a view of the valve and associated flap embodiment shown in FIG. 4, showing the flap attached to a divider.
Figure 5B:
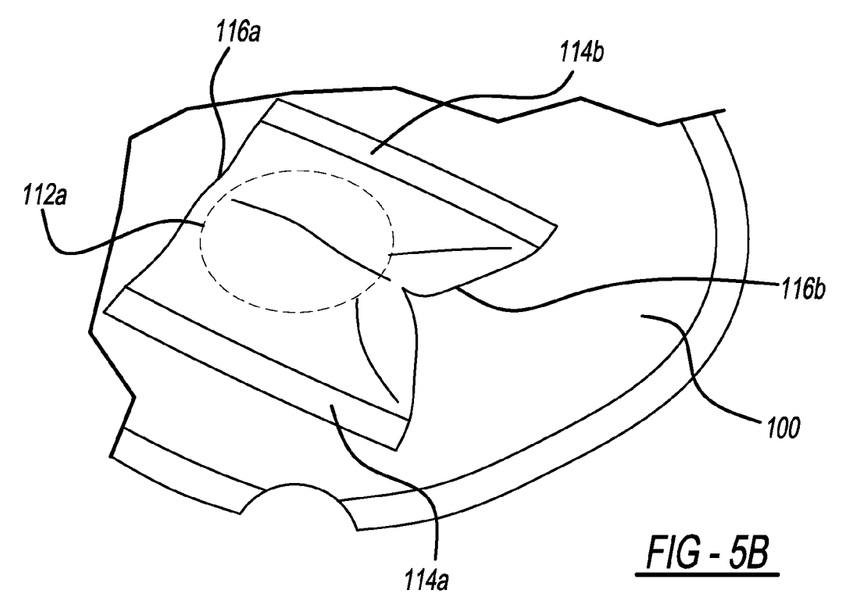
FIG. 5B is a view of the valve and associated flap embodiment shown in FIGS. 4 and 5A showing a simulated movement of the non-attachment portions of the flap toward the valve opening during filling and/or operation of the airbag.

FIG. 5A is a view of the valve and associated flap embodiment shown in FIG. 4, showing the flap 112b attached to a divider 100. FIGS. 4 and 5B also show central portions of the flap non-attachment edges 116a and 116b drawn or pinched inwardly to simulate and illustrate the protrusion of the central portion 112c of the flap 112b through opening 112a and the resulting movement of non-attachment edges 116a and 116b toward the opening responsive to the presence of a relatively higher gas pressure in lower chamber 104. It may be seen from the drawings that flap 112b is attached to the divider 100 such that the non-attachment edges 116a and 116b are prevented from reaching the opening 112a when the divider 100 is extended or spread and maintained in an extended configuration.

In particular embodiments, and depending on the requirements of a particular application, the minimum distance S is within the range 20 to 40 millimeters inclusive within the limits of pertinent manufacturing and fabrication tolerances. In a more particular embodiment, the minimum distance S is 30 millimeters.

In particular embodiments, the opening 112a has a diameter D within the range 60 to 150 millimeters inclusive within the limits of pertinent manufacturing and fabrication tolerances. In a more particular embodiment, diameter D is 120 millimeters.

In particular embodiments, the dimension L is within the range 220 to 280 millimeters inclusive within the limits of pertinent manufacturing and fabrication tolerances. In a more particular embodiment, the dimension L is 270 millimeters.

The values of L2 and L3 may be determined in relation to the other valve dimensions and according to the requirements of a particular application, so as to provide the desired minimum predetermined spacing S between the flap non-attachment edges and the edges of the opening 112a. In a particular embodiment, the dimension L3 is 180 millimeters.

The flap may have any dimensions suitable for a particular application, depending on, for example, the size of the valve opening 112a, the number of openings, the shape(s) of the opening(s), the pressure differentials under which the valve is expected to operate, and other pertinent parameters.

Specifying the dimensions of the flap 112b and opening 112a as described herein also enables the flap size to be optimized so as to minimize the amount of material used for the flap, thereby minimizing the impact of flap size on valve response time. The optimum dimensions for the valve flap and opening 112a may be determined analytically or by iterative testing.

The pressure force with which the valve material closes the flow passage also increases as the pressure difference between the two chambers increases, so that the non-return valve remains closed, even at relatively high pressure differences between the chambers.

In another embodiment, it has also been found that the values of the parameters L, L2, L3, A1, A2, d, and the diameter D of opening 112a may be determined so as to provide a region of overlap between the edges of opening 112a and one or more of non-attachment edges 116a and 116b, as shown in FIG. 4B. These overlap regions define openings Z1 and Z2 enabling a controlled flow of gases from the second chamber (the lower chamber in the embodiment shown) back into the first (or upper) chamber. The values of the parameters may be specified so that the area of each of the openings Z1 and Z2 reaches a desired value (or falls within a predetermined range) when the central portion 112c of the flap 112b is forced into the opening 112a by a reverse pressure differential. This enables the flow rate of gases through the openings Z1 and Z2 to be controlled. Values of the parameters L, L2, L3, A1, A2, d, and the diameter D of opening 112a needed to provide the desired areas of openings Z1 and Z2 for a particular application may be determined analytically or iteratively, through experimentation, for example.

If desired, the flap may be shaped and/or attached to the divider such that the opening 112a overlaps with only one of non-attachment edges 116a and 116b during application of the reverse pressure differential. This enables an additional degree of control over the area through which the gas flows, and also enables the return gas flow to be directed to a particular side or region of the first chamber, if desired.

Flap 112b may be formed from the same material as the divider 100 of any of the panels 12, 14, 16, or the flap may be formed from any other suitable gas-impermeable material or materials. Flap 112b is also structured to be relatively pliable so that it can respond rapidly to pressure differentials between the upper and lower chambers as described above.

In the embodiments described herein, any number of one-way valves of any desired type (or types) may be incorporated into the divider 100 in any suitable location(s), according to the requirements of a particular application, such as the desired fill time of the airbag, the location(s) (if any) inside the airbag that are to be filled prior to the filling of other locations, and other pertinent factors.

Figure 3:
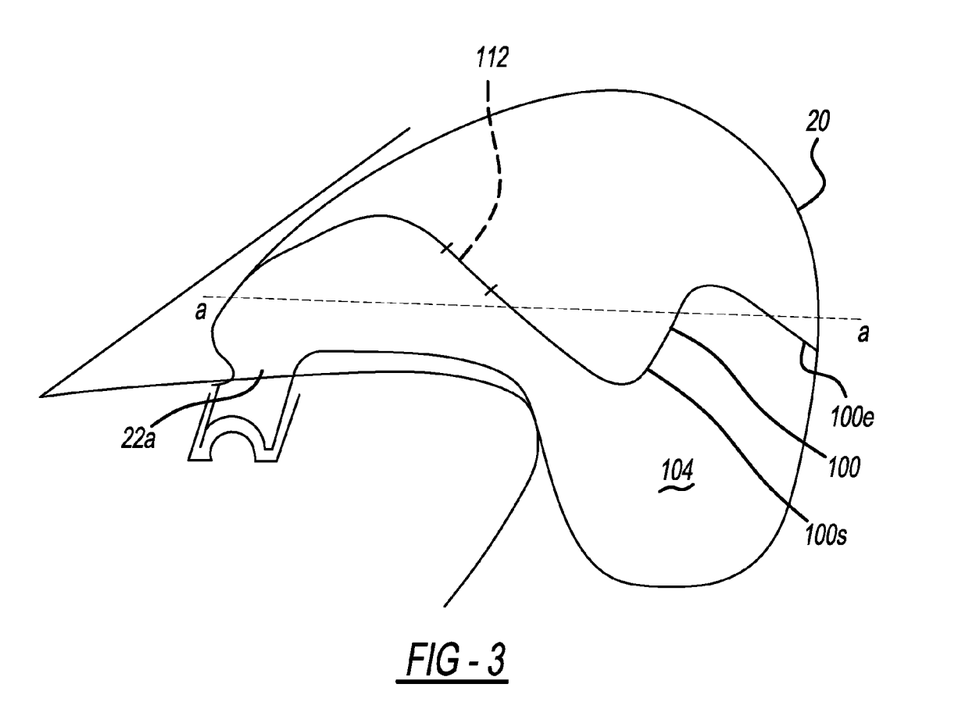
FIG. 3 is a schematic view of an airbag showing an alternative embodiment of a divider attached to the interior of an airbag.

In another particular embodiment 110 of the airbag shown in FIG. 3, divider 100 is attached to the inner surfaces of the airbag panels 12, 14, 16 so as to form an undulating surface 100s with alternating adjacent flat portions extending in various directions and terminating in a downwardly-extending leading edge 100e connected to front side 20, with valve 112 positioned in a desired location along the divider 100. However, the seams connecting the divider 100 to the main and side panels may have any locations and/or configurations necessary for the requirements of a particular application. For efficient operation of the valve embodiment previously described, it is desirable that the valve opening 112a and the seams attaching the flap to the divider be located along a relatively flat portion of the divider. The design parameters of valve 112 and the shape of the divider 100 as attached to the airbag panels 12, 14, 16 may be optimized so as to inflate one or more portions of the airbag prior to other portions of the airbag and/or to deflect or otherwise respond in a desired manner to the impact of various portions of a vehicle passenger on the airbag exterior.

In addition, airbags having the same exterior dimensions and structure may be used for multiple applications, because variations in airbag performance characteristics due to design requirements may be achieved by modifying the interior structure of the airbag (for example, by changing the location of the divider, by modifying the flow characteristics of the valve 112 connecting the upper and lower chambers, and by changing the upper chamber vent locations and characteristics). This ability to use a common exterior structure provides a degree of uniformity in bag design and manufacturing.

Figure 6:
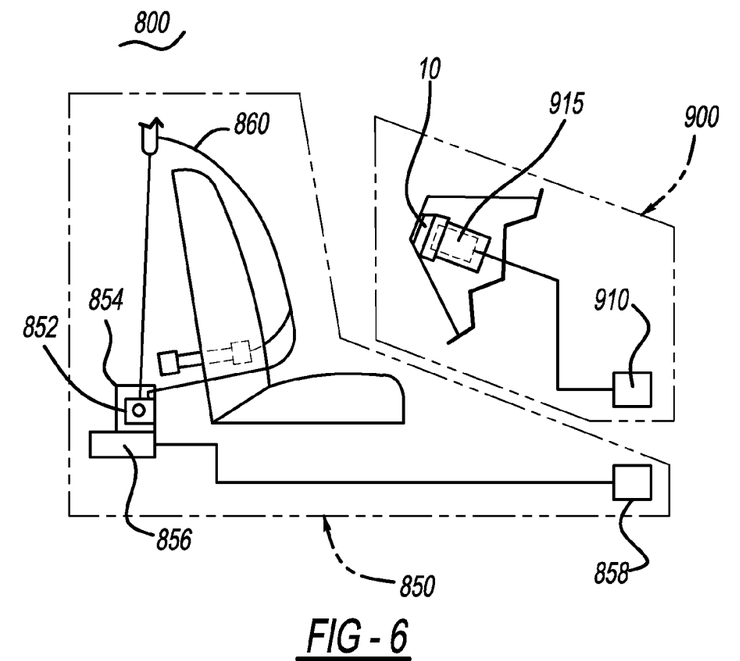
FIG. 6 is a view of a vehicle occupant protection system incorporating an airbag in accordance with an embodiment of the present invention.

Referring now to FIG. 6, an embodiment 10 of the airbag described herein may be incorporated into an airbag system 900. Airbag system 900 includes at least one gas source 915 (for example, a known inflator or gas generating system) and airbag 10 in accordance with an embodiment described herein. The airbag is operatively coupled to the gas source so as to enable fluid communication therewith upon activation of the gas generating system. Airbag system 900 may also include (or be in communication with) a collision event sensor 910. Collision event sensor 910 includes a known collision sensor algorithm that prompts actuation of airbag system 900 via, for example, activation of gas source 915 in the event of a collision.

Referring again to FIG. 6, airbag system 900 may also be incorporated into a broader, more comprehensive vehicle occupant protection system 800 including additional elements such as a safety belt assembly 850. FIG. 6 shows a schematic diagram of one exemplary embodiment of such a protection system. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a known safety belt pretensioner 856 may be coupled to belt retractor mechanism 854 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 850 may also include (or be in communication with) a collision event sensor 858 (for example, an inertia sensor or an accelerometer) including a known collision sensor algorithm that prompts actuation of belt pretensioner 856 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

References herein to the positions or orientations of elements, for example "upper", "lower", etc., refer to characteristics of an inflated airbag when mounted in a vehicle. It should be noted that the orientation of various elements may differ according to other exemplary embodiments, and that such variations are intended to be encompassed by the present disclosure.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. An airbag comprising:
   an outer shell defining an interior of the airbag;
   a divider positioned in the interior so as to divide the interior into a first chamber and a second chamber; and
   a valve mechanism operatively coupled to the divider, the valve mechanism including:
   an opening enabling fluid communication between the first and second chambers; and
   a flap positioned in the second chamber overlying the opening, the flap being structured to deflect in a direction away from the opening responsive to a pressure differential urging a flow of gas from the first chamber through the opening into the second chamber, the flap also being structured to block the opening responsive to a reverse pressure differential urging a flow of gas from the second chamber through the opening into the first chamber, the flap including at least one attachment edge along which the flap is attached to the divider and at least one non-attachment edge along which the flap is not attached to the divider,
   wherein the valve is structured so that the at least one non-attachment edge overlaps an edge of the opening during application of the reverse pressure differential to the flap, thereby forming a gas flow passage defined by a portion of the edge of the opening and a portion of the at least one non-attachment edge.

2. A vehicle including an airbag in accordance with claim 1.

3. A vehicle occupant protection system including an airbag in accordance with claim 1.

4. The airbag of claim 1 wherein the opening has a diameter (D) within the range 60 to 150 millimeters inclusive.

5. The airbag of claim 4 wherein the opening has a diameter (D) of 120 millimeters.

6. The airbag of claim 1 wherein the at least one attachment edge is attached to the divider along a length (L), and wherein the length (L) is within the range 220 to 280 millimeters inclusive.

7. The airbag of claim 6 wherein the length (L) is 270 millimeters.

8. The airbag of claim of claim 1 wherein the flap is attached to the divider along a pair of parallel seam lines, and wherein the seam lines are spaced apart a distance of 180 millimeters.

* * * * *